United States Patent [19]

Kawate

[11] Patent Number: 4,458,184
[45] Date of Patent: Jul. 3, 1984

[54] BRUSHLESS D.C. MOTOR HAVING ASYMMETRICALLY POSITIONED POLES

[75] Inventor: Yousuke Kawate, Ikeda, Japan
[73] Assignee: Nippon Densan Corp., Kyoto, Japan
[21] Appl. No.: 405,867
[22] Filed: Aug. 6, 1982

[30] Foreign Application Priority Data

May 5, 1981 [JP] Japan ................................. 56-69892

[51] Int. Cl.³ ............................................. H02K 29/02
[52] U.S. Cl. .................................... 318/254; 318/138; 318/439; 310/46
[58] Field of Search ................... 318/138, 254, 254 A, 318/439; 310/268, 68 B, 46

[56] References Cited

U.S. PATENT DOCUMENTS

| | | | |
|---|---|---|---|
| 3,486,099 | 12/1969 | Brunner et al. | 310/10 X |
| 3,873,897 | 3/1975 | Müller | 310/172 X |
| 4,217,508 | 8/1980 | Uzuka | 310/46 |
| 4,371,817 | 2/1983 | Müller | 310/46 X |

*Primary Examiner*—G. Z. Rubinson
*Assistant Examiner*—Bentsu Ro
*Attorney, Agent, or Firm*—Kinney & Lange

[57] ABSTRACT

A brushless DC motor has a rotor which is partially magnetized. The magnetized portion of the rotor extends in a circumferential arc of approximately 180° and has a first magnetic polarity (either north or south polarity). The stator of the brushless DC motor has two pairs of asymmetrically positioned poles. The first pair of poles are circumferentially spaced from one another by an angle which is greater than 180°. Similarly, the second pair of poles are circumferentially spaced from one another at an angle greater than 180°. First and second windings are wound on the first and second pairs of poles, respectively. A magnetic sensor senses the angular position of the magnetized portion of the rotor and provides a signal to a control circuit, which alternately energizes the first and second windings in synchronism with the sensed angular position of the rotor. The torque generated is greater than the 180° angle, and no point of zero torque exists. The motor, therefore, can be stopped at any position and restarted even though only a single magnetic sensor is used.

7 Claims, 7 Drawing Figures

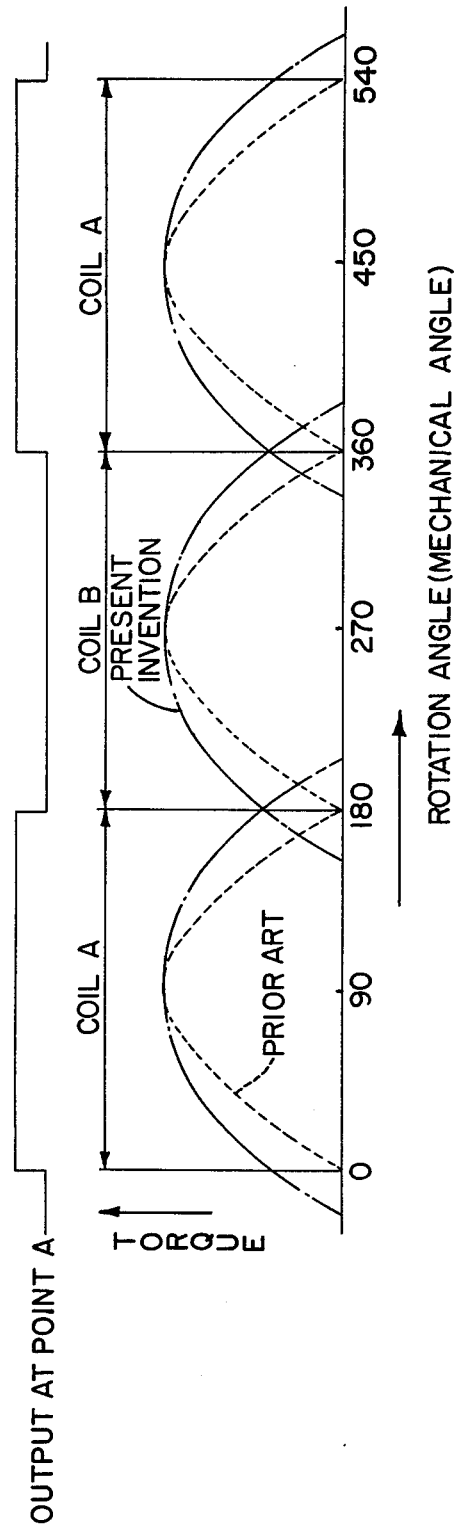
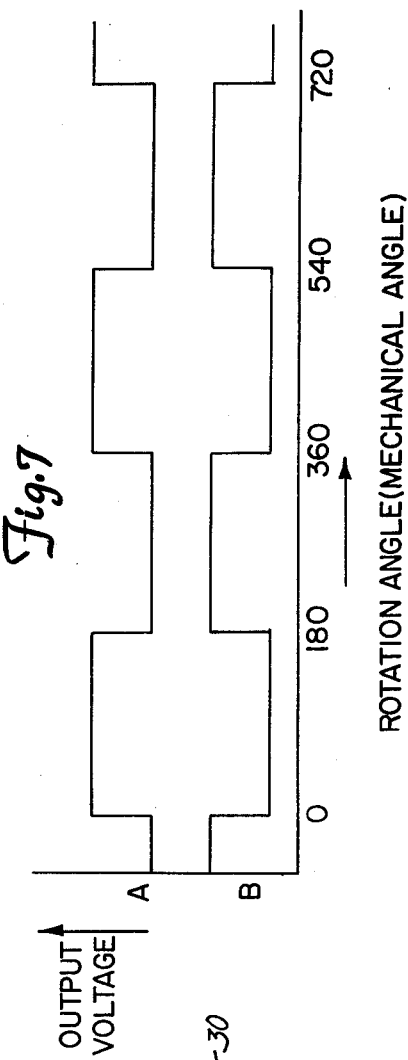
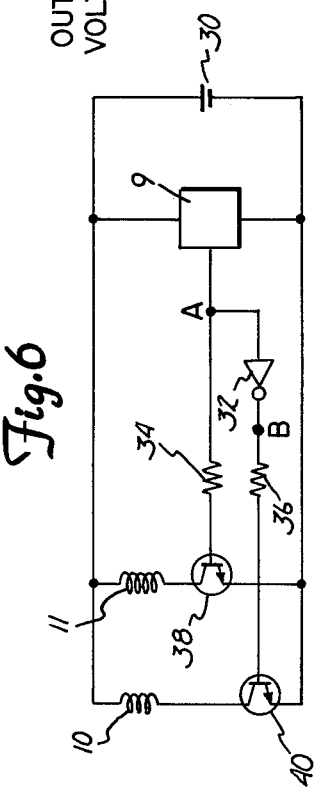

BRUSHLESS D.C. MOTOR HAVING ASYMMETRICALLY POSITIONED POLES

BACKGROUND OF THE INVENTION

1. Field of the Invention

The present invention relates to brushless DC motors, and in particular to a brushless DC motor which uses a single magnetic sensor for sensing position of the rotor.

2. Description of the Prior Art

Brushless DC motors have been developed and used in the past. One proposed construction is illustrated in U.S. Pat. No. 3,486,099 by Brunner et al, which uses two Hall effect sensors which control energization of four windings in order to generate a rotating magnetic field.

In the past, brushless DC motors have also been proposed which use only a single Hall sensor. This type of brushless DC motor would be much less expensive due to fewer windings, fewer Hall sensors, and simpler control circuitry. This type of brushless DC motor, however, has a significant defect.

In particular, the proposed prior art single sensor brushless DC motor typically has a rotor which is half magnetized with a north polarity and half magnetized with a south polarity. The magnetic periodic angle of the stator (which is mounted inside the rotor) is 180°. The stator has a pair of magnetic poles which are located close to the inside of the rotor and are located 180° from one another. If only one magnetic sensor (for example a Hall sensor) is used to detect the rotor location, the correlation between the torque will be zero at an angle of 180° and 360°. If the motor is stopped with the rotor at either of these two points of zero torque, the motor will not restart, since no torque is applied to the rotor. As a result, a motor with this configuration is of little practical use.

In an attempt to overcome this problem while using a single magnetic sensor, a brushless DC motor is proposed in U.S. Pat. No. 3,873,897 by Muller in which the air gap between the rotor and the stator varies as a function of angular degrees.

There is a continuing need for improved brushless DC motors in which only a single rotor position magnetic sensor is used and in which the point of zero torque is eliminated. It is further desirable that improved brushless DC motors be developed having an organization and construction which makes the cost significantly less than prior art brushless DC motors.

SUMMARY OF THE INVENTION

The present invention is a brushless DC motor which includes a rotor and a stator which are coaxially aligned and are separated by an air gap. The rotor has a magnetized portion and a non-magnetized portion. The magnetized portion of the rotor extends in a circumferential arc having a first angle and has a first magnetic polarity. The stator has two pair of circumferentially spaced poles. The first pair of poles are circumferentially spaced from one another by an angle which is greater than the first angle, and the second pair of poles are also circumferentially spaced from one another by an angle which is greater than the first angle.

A first winding is wound on the first pair of poles, and a second winding is wound on the second pair of poles. When the first winding is energized, it causes a first pole of the first pair to have the first magnetic polarity and causes the second pole of the first pair to have a second magnetic polarity. When the second winding is energized, it causes a first pole of the second pair to have the first magnetic polarity and a second pole of the second pair to have the second magnetic polarity.

The brushless DC motor further includes magnetic sensing means which senses angular position of the magnetized portion of the rotor and a control circuit which is responsive to the magnetic sensing means. The control circuit alternately energizes the first winding and the second winding in synchronism with the sensed angular position of the magnetized portion of the rotor.

Due to the asymmetric relationship between the angle of the magnetized portion of the rotor and the angles between each of the two pairs of poles, there is no position of zero torque, even though only a single magnetic sensor is needed.

In preferred embodiments, the first angle corresponding to the circumferential arc of the magnetized portion of the rotor is approximately 180°, and each pair of poles is circumferentially spaced by an angle which is greater than 180°.

BRIEF DESCRIPTION OF THE DRAWINGS

FIG. 5 is a graph showing torque as a function of revolution angle for the motor of the present invention shown in FIGS. 1 and 2 and for the prior art motor of FIGS. 3 and 4.

FIG. 6 is a circuit diagram showing a control circuit for the motor of FIGS. 1 and 2.

FIG. 7 shows output voltage as a function of revolution angle at points A and B of the circuit of FIGS. 6.

DETAILED DESCRIPTION OF THE PREFERRED EMBODIMENTS

The brushless DC motor of the present invention, and its operation, is illustrated in FIGS. 1, 2, 5, 6 and 7.

Figure 1:
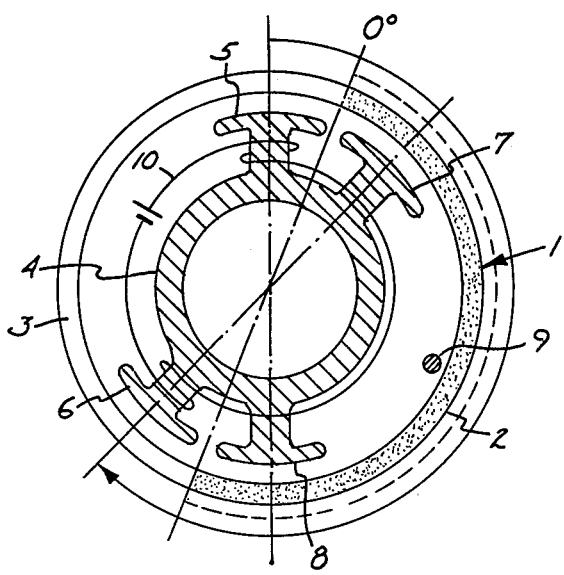
FIGS. 1 and 2 are cross-sectional, partially schematic views illustrating the brushless DC motor of the present invention, with the rotor in two different positions.
Figure 2:
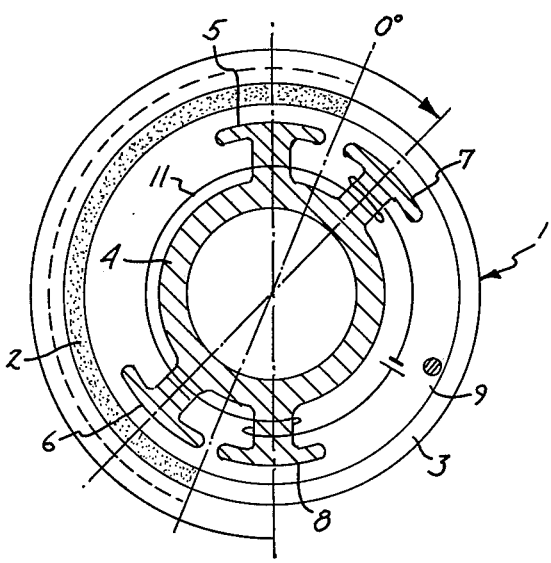

The motor of the present invention includes rotor 1, which is made of magnetic material. The inside of rotor 1 is magnetized partially with either a north (N) polarity or a south (S) polarity. FIGS. 1 and 2 show rotor 1 with a magnetized portion 2 of N polarity and a nonmagnetized portion 3. In this case, each portion 2 and 3 covers approximately half of the circumference of rotor 1 so that the magnetic periodic angle of rotor 1 is approximately 180°.

The choice of N polarity or S polarity for magnetized portion 2 is determined depending upon stator 4 located inside rotor 1. As stated above, in the particular embodiment shown in FIGS. 1 and 2, magnetized portion 2 is shown having an N polarity.

Stator 4 has a pair of stator magnetic poles 5 and 6 and a pair of stator magnetic poles 7 and 8. Poles 5 and 6 and poles 7 and 8 are located closely inside rotor 1. Each pair of magnetic poles 5 and 6 and 7 and 8 are located at asymmetric positions which are more than the rotor revolution angle of 180° of rotor 1. In other words, the angle between pole 5 and pole 6 is greater than 180°, and the angle between pole 8 and pole 7 is greater than 180°.

Rotor location sensor 9 is in a fixed position between rotor 2 and stator 4, and senses the location of rotor 1. Rotor location sensor 9 operates rotor 1 (i.e. causes rotor 1 to rotate) by controlling a supply of current flowing in A stator coil 10 (shown in FIG. 1), and B stator coil 11 (shown in FIG. 2) by means of the output of sensor 9.

In this invention, when rotor 1 is located at the place shown in FIG. 1 and A stator coil 10 wound on magnetic poles 5 and 6 is energized and thereby magnetized, the operating range of N polarity magnetized portion 2 of rotor 1 is the electric angle shown by the solid line arc in FIG. 1. The detection range is the electric angle range shown by the broken line arc in FIG. 1. As can be seen, the operating range defined by the spacing of poles 5 and 6 is an angle which is greater than the 180° detection range.

When rotor 1 is located at the place shown in FIG. 2 and B stator coil 11 wound on magnetic poles 7 and 8 is energized and thereby magnetized, the operating range of N polarity magnetized portion 2 of rotor 1 is the electric angle range shown by the solid line arc of FIG. 2. The detection range is the electric angle range shown by the broken line arc in FIG. 2. Once again, the operating range defined by the angle between pole 8 and pole 7 is greater than the 180° detection range. As a result, the brushless DC motor of the present invention, as illustrated in FIGS. 1 and 2, is not zero at any angular position of rotor 1.

Figure 3:
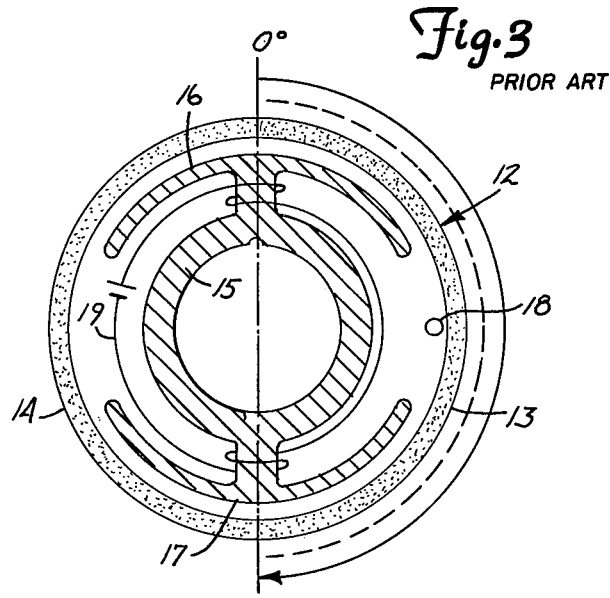
FIGS. 3 and 4 are cross-sectional, partially schematic views illustrating a prior art brushless DC motor, with the rotor in two different positions.
Figure 4:
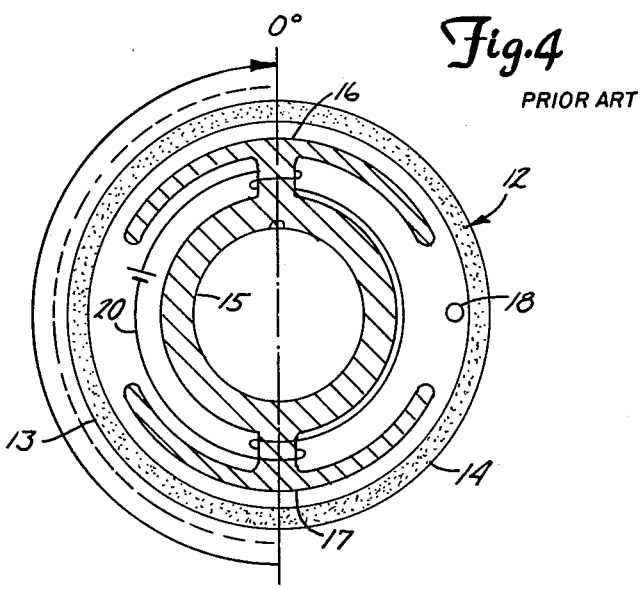

A prior art single sensor brushless motor is shown in FIGS. 3 and 4. Inside of rotor 12 is a magnetized N polarity portion 13 and a magnetized S polarity portion 14, each covering half of the circumference of rotor 12. The magnetic periodic angle of stator 15, which is inside rotor 12, is 180°.

Stator magnetic poles 16 and 17, which are close to the inner surface of rotor 12, are located at a symmetrical position (i.e. 180° apart from one another) so that the rotor revolution angle is 180°.

Therefore, if only one magnetic detector 18 is used to detect the location of rotor 12, the correlation between the torque will be zero at an angle of 180° and an angle of 360° in FIGS. 3 and 4. The motor, therefore, is of little practical use since it will not restart if it is once stopped with rotor 12 at either of the points of zero torque.

In FIG. 3, A stator coil 19 is shown wound on poles 16 and 17, and in FIG. 4, B stator coil 20 is shown wound on poles 16 and 17. The electric angles shown by the broken line arc and the solid line arc in both FIGS. 3 and 4 are the detection range and torque operating range, respectively, which act on the north polarity portion 13 of rotor 12.

FIG. 5 shows the correlation between torque and rotation angle for both the motor of the present invention illustrated in FIGS. 1 and 2 and the prior art motor shown in FIGS. 3 and 4. The broken line shows the torque change as a function of revolution or rotation angle of the prior art motor, and the solid line shows torque change as a function of rotation angle for the motor of the present invention. In the case of the motor of the present invention, through rotation angles 0°–180°, the generated torque is greater than zero at all points, because the range of torque extends over more than 180°. Similarly, through rotation angles 180°–360° (as illustrated in FIG. 2) the generated torque is always greater than zero since the torque range is greater than 180°. Therefore, this generated torque is repeated and the motor continues rotation even though only a single rotor location sensor 9 is illustrated. The solid line representing torque in FIG. 5 shows that torque is greater than zero at all angular positions of rotor 1. In contrast, the prior art motor shown in FIGS. 3 and 4 has places of zero torque at 0°, 180°, and 360°.

FIG. 6 shows a circuit diagram of a circuit used to control windings 10 and 11 in response to signals from rotor location detector 9. As shown in FIG. 6, the circuit includes rotor location detector 9, A stator coil winding 11, B stator coil winding 10, DC power source 30, inverter 32, resistors 34 and 36, and transistors 38 and 40. A stator coil 11 is turned on when voltage at point A is high, thus turning on transistor 38 and energizing A stator coil 11. Similarly, B coil 10 is energized when voltage at point A is low so that voltage at point B is high and transistor 40 is turned on. The voltage at point A is the output of rotor location detector 9, and the voltage at point B is the inverse of the voltage at point A.

FIG. 7 shows the output voltages at points A and B as a function of rotation angle. In addition, the output voltage at point A is also illustrated in FIG. 5.

The reason there is no dead spot (i.e. no point of zero torque) with the 180° of the present invention, even though only one rotor position detector 9 is used, is because each pair of stator magnetic poles 5, 6 and 7, 8 is located at an asymmetric position which is more than the rotor revolution angle of 180°. In other words, the spacing between magnetic pole 5 and magnetic pole 6 is greater than 180°, and the angle between pole 8 and pole 7 is similarly greater than 180°. As a result, over 180° electrical angle torque is obtained.

The reason the inside of rotor 1 is partially magnetized, with the magnetized portion 2 being either N polarity or S polarity and with the magnetized and nonmagnetized portions 2 and 3 dividing the circumference of rotor 1, is to avoid generating a reverse torque in the case of the existence of a south pole in front of the north pole.

In the present invention illustrated in FIGS. 1 and 2, two pair of stator poles are shown. It should be recognized, however, that a larger number of stator poles can be used so long as the number of poles is an even number times 4. In other words, the number of stator poles used can, in some cases, be 8 or 16.

The brushless DC motor of the present invention has several important advantages. First, it has no dead spot (i.e. no position of zero torque) even though only one rotor location detector 9 is used. Second, it is inexpensive to manufacture. Third, its simple construction reduces the likelihood of malfunction and permits easy maintenance.

Although the present invention has been described with reference to preferred embodiments, workers skilled in the art will recognize that changes may be made in form and detail without departing from the spirit and scope of the invention.

What is claimed is:

1. A brushless direct current motor comprising:
   an outer rotor for rotation in a first circumferential direction about an axis, the rotor having a first magnetized portion of a first magnetic polarity which extends in a circumferential arc having a first angle;
   an inner stator coaxially aligned within the rotor, the stator having a generally cylindrical core and having a first pair of T-shaped poles projecting radially outward from the core and circumferentially spaced from one another in the first circumferential direction by an angle which is greater than the first angle, and having a second pair of T-shaped poles projecting radially outward from the core and circumferentially spaced from one another in the first circumferential direction by an angle which is greater than the first angle, each T-shaped pole having a radially aligned body and a circumferentially aligned head;

an air gap separating an inner surface of the rotor and the heads of the first and second pairs of T-shaped poles;

a first winding wound on the bodies of the first pair of poles to cause the head of a first pole of the first pair of T-shaped poles to have the first magnetic polarity and the head of a second pole of the first pair of T-shaped poles to have a second magnetic polarity when the first winding is energized;

a second winding wound on the bodies of the second pair of poles to cause the head of a first pole of the second pair of T-shaped poles to have the first magnetic polarity and the head of a second pole of the second pair to have the second magnetic polarity when the second winding is energized;

magnetic sensing means for sensing angular position of the rotor; and a control circuit connected to and responsive to the magnetic sensing means for alternately energizing the first and second windings in synchronism with the sensed angular position of the rotor to cause rotation of the rotor in the first circumferential direction.

2. The motor of claim 1 wherein the first angle is approximately 180°.

3. The motor of claim 2 wherein the first pole of the first pair and the first pole of the second pair are separated from one another by an angle of approximately 180°, and wherein the second pole of the first pair and the second pole of the second pair are separated from one another by an angle of approximately 180°.

4. The motor of claim 2 wherein the control circuit alternately energizes the first winding for approximately 180° of rotation of the rotor and then the second winding for approximately 180° of rotation of the rotor.

5. The motor of claim 1 wherein the magnetic sensing means is a single magnetic sensor.

6. The motor of claim 5 wherein the magnetic sensor is positioned at a circumferential position approximately midway between the first and second poles of the first pair.

7. The motor of claim 1 wherein the first and second poles of the first pair of T-shaped poles are circumferentially spaced from one another in the first circumferential direction by an angle which is greater than 180°; and wherein the first and second poles of the second pair of T-shaped poles are circumferentially spaced from one another in the first circumferential direction at an angle which is greater than 180°.

* * * * *